US008843745B2

(12) United States Patent
Roberts, Jr.

(10) Patent No.: US 8,843,745 B2
(45) Date of Patent: Sep. 23, 2014

(54) METHODS OF AUTHORIZING A COMPUTER LICENSE

(75) Inventor: Henry Arnold Roberts, Jr., Leavenworth, IN (US)

(73) Assignee: Nalpeiron Inc., Palo Alto, CA (US)

(*) Notice: Subject to any disclaimer, the term of this patent is extended or adjusted under 35 U.S.C. 154(b) by 99 days.

(21) Appl. No.: 13/094,341

(22) Filed: Apr. 26, 2011

(65) Prior Publication Data

US 2012/0278618 A1 Nov. 1, 2012

(51) Int. Cl.
*H04L 9/32* (2006.01)
*G06F 21/10* (2013.01)

(52) U.S. Cl.
CPC ........ *H04L 9/3271* (2013.01); *G06F 2221/072* (2013.01); *H04L 2209/56* (2013.01); *G06F 21/10* (2013.01)
USPC ................. 713/168; 705/59; 705/67; 380/229

(58) Field of Classification Search
CPC ..... H04W 12/06; H04W 12/04; H04W 8/265; H04L 63/08; H04L 63/0823; H04L 63/0428; H04L 9/0825; H04L 9/14; H04L 9/08; H04L 9/32; H04L 9/3271; G06F 21/60; G06F 21/64; G06F 21/31
USPC .............. 713/168, 156–159; 380/229; 705/67
See application file for complete search history.

(56) References Cited

U.S. PATENT DOCUMENTS

| 5,490,216 | A  | * | 2/1996  | Richardson, III | ............... 705/59 |
| 6,308,266 | B1 | * | 10/2001 | Freeman | ....................... 713/156 |
| 7,225,333 | B2 | * | 5/2007  | Peinado et al. | ............... 713/164 |
| 2002/0002674 | A1 | * | 1/2002 | Grimes et al. | ................ 713/156 |
| 2010/0125670 | A1 | * | 5/2010 | Dondeti et al. | ............... 709/229 |

* cited by examiner

*Primary Examiner* — Eleni Shiferaw
*Assistant Examiner* — Gregory M Elmore
(74) *Attorney, Agent, or Firm* — Seyfarth Shaw LLP; Brian Michaelis

(57) ABSTRACT

A system and method of authorizing a product including transmitting from an end user device a character string, including a Transaction ID, to a licensing authority. The licensing authority encrypts the Transaction ID using an encryption key associated with a product for which the end user is seeking authorization to produce an Authorization number. Each product is associated with a different encryption key resulting in a different Authorization number being produced for each product based on the same Transaction ID. The licensing authority then returns the Authorization number to the end user device. A decryption processor associated with the end user device decrypts the Authorization number using an unchangeable decryption key and compares the decrypted Authorization number with the Transaction ID. If the decrypted Authorization number matches the Transaction ID the product is authorized.

19 Claims, 5 Drawing Sheets

METHODS OF AUTHORIZING A COMPUTER LICENSE

FIELD

The systems and methods disclosed herein relate to authorizing software for use on a computer via a license. More particularly, the systems and methods disclosed herein relate to authorizing a computer license in which the computer license is reauthorized a number of times.

BACKGROUND

Many software manufacturers in the market today require a purchaser and end user to obtain a license to use a software program or product. Some products contain a dialog box that appears during installation of the product with the license information. When an end user accepts the terms and conditions of the license, usually by clicking an "ACCEPT" button, the product is then installed on the computer and the product is authenticated or authorized.

An example of authorizing a product is disclosed in U.S. Pat. No. 5,490,216 to Richardson, entitled System for Software Registration ("the '216 patent"). Products are authorized by sending some type of Computer ID to a licensing authority, and/or customer or end user specific information such as name and/or credit card number. The licensing authority and end user then use an identical algorithm at each end to transform the Computer ID into an authorization key. According to the '216 patent, both algorithms will always process the same Computer ID exactly the same way. If the authorization key generated by the licensing authority and received by the end user's computer is identical to the one created on the end user's computer, the product is available to use. The uniqueness of each authorization key is based on aspects of the end user's computer, aspects of the program (such as a checksum), and/or end user specific information such as name, address, credit card number, etc.

A unique Computer ID (and/or purchaser ID) is necessary for this technology to produce massively different activation keys for each end user. Without the unique Computer ID, one activation key would work on all of the computers. Problems with this technique include that it limits how products are activated. Additionally, the system and methods of the '216 patent utilizes very long alphanumeric numbers that are difficult for human beings to manage, communicate, or manually enter.

Still further, the system and methods of the '216 patent opens up the activation process to serious security flaws. More particularly, one popular method for using illegal copies of products is by unlocking them with rogue activation key generators. The process described in the '216 patent makes this easy. For instance, once any key generator is copied, the copies can be used to generate activation keys for all products using that system, or if end users can get a copy they can use the copy to generate activation keys for products the end users are not entitled to use. This happens frequently as can be shown by doing a quick web search for popular products and the term "keygen." Processes known in the prior art make it possible to produce a key generator by copying a section of the protected product (or protection DLL), since both the key generator and the protection produce the identical hash of the input data.

In the case of a company that sells copy protection, unless that company creates a new algorithm for each customer or end user, the same key generator can be used to generate activation keys for all customers or end users and all products. This is a serious weakness in the copy protection system. Reverse engineering a single product will result in a rogue activation key generator for multiple products.

If a publisher or licensing authority desires to lease or license a product, that product must be reactivated continuously on the same computer. Using existing technology, reactivation is either impossible or very difficult because the unique Computer ID will always be the same and the customer or end user information will be the same. As a result, the activation keys will always be the same and the end user can continuously reuse the same activation key, defeating the purpose of enforcing the lease or license.

Unique Computer IDs and activation keys are typically of the type: VY13V-249B5-A25BC-PBC43-648DG. Computer IDs and activation keys of this type are difficult to verbally transmit from end user to licensing authority as the letters B, C, P, G, and V sound very much the same and the differences can be lost over a telephone connection unless both parties are well versed in using phonetics such as are used by the military.

SUMMARY

The systems and methods for authorizing a computer license disclosed herein relate to authorizing a computer license in such a way that the computer license is reauthorized with a completely different authorization number each time, and the identical algorithm is not used at each end (i.e. at the end-user/client computer and the licensing authority/server computer). In one aspect, the systems and methods disclosed herein prevent the authorization number generator from being compromised even if made available to potential end users, and the numbers used in the transactions can be all digits and relatively short.

In an illustrative embodiment, the systems and methods disclosed herein are used to authorize a computer license or software program. During the authorization process, an end user device transmits a character string, including a Transaction ID, to a licensing authority. The licensing authority receives the character string from the end user device and encrypts the Transaction ID using an encryption key associated with a product for which the end user is seeking authorization to produce an Authorization number. Illustratively, each product is associated with a different encryption key resulting in a different Authorization number being produced for each product based on the same Transaction ID. Thus, the same identical Transaction ID can be encrypted into as many different Authorization numbers as there are products. The licensing authority then returns the Authorization number to the end user device.

The end user device receives the Authorization number from the licensing authority and decrypts the Authorization number using an unchangeable, decryption key which results in a decryption algorithm that can only decrypt a series of digits or characters the same way every time. Therefore the end user device can only correctly decrypt products intended for it. The same Authorization number will always be decrypted into the same Transaction ID. As a result, the product on each end user device is only capable of accepting the Authorization number for that specific product. Authorization keys for different products will be decrypted into something that does not match the correct Transaction ID. This prevents reverse engineering of the Authorization numbers to product a rogue authorization number generator for multiple products. Only the Authorization number encrypted using the encryption key matching the decryption key will produce a correct Transaction ID for a product.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Detailed embodiments of the systems and methods are disclosed herein, however, it is to be understood that the disclosed embodiments are merely exemplary of the systems and methods, which may be embodied in various forms. Therefore, specific functional details disclosed herein are not to be interpreted as limiting, but merely as a basis for the claims and as a representative basis for teaching one skilled in the art to variously employ the systems and methods disclosed herein.

Generally, the systems and methods disclosed herein include and may be implemented within a computer system or network of computer systems having one or more databases and other storage apparatuses, servers, and additional components, such as processors, modems, terminals and displays, computer-readable media, algorithms, modules, and other computer-related components. The computer systems are especially configured and adapted to perform the functions and processes of the systems and methods as disclosed herein.

Figure 1:
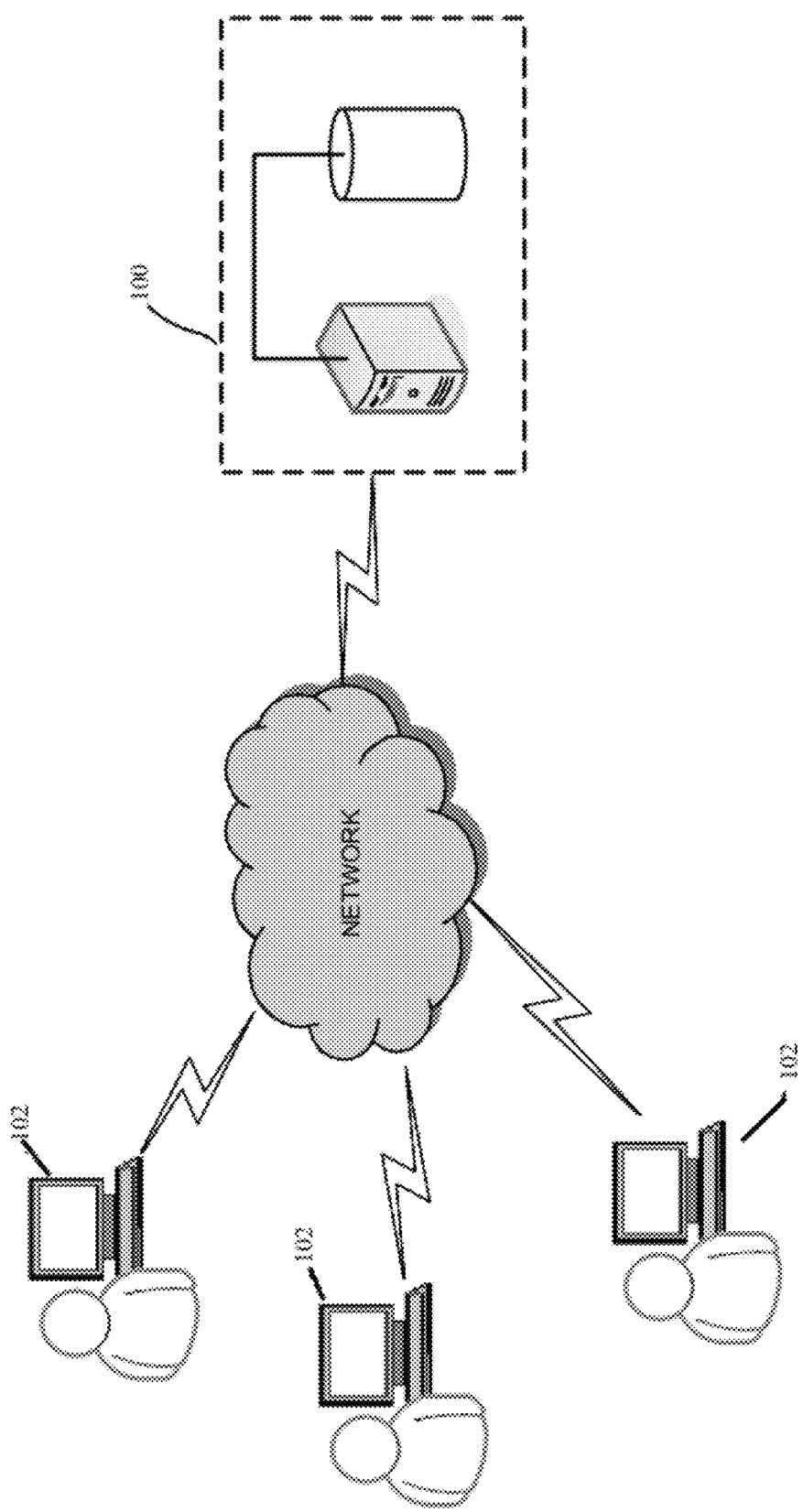
FIG. 1 illustrates an embodiment of a system architecture for implementing the systems and methods of authorizing a computer license.

In an illustrative embodiment, the systems and methods disclosed herein relate to software and/or computer licensing implementations, and in particular protection schemes for controlling access and copying of software offered under license. A system architecture for implementing the systems and methods of authorizing a computer license according to an illustrative embodiment is described with reference to FIG. 1. As illustrated, the system includes at least one licensing authority 100 such as may be implemented on a server computer configured to deliver content, programs and or provide access to software of various sorts, and at least one end user device 102 such as an electronic client-system in communication with the at least one licensing authority 100. The licensing authority 100 illustratively includes a processor, encryption processor, database, module, server, computer system or network of computer systems associated with a publisher or licensor of the product that can access, provide, transmit, receive, and modify information over the wired or wireless network.

The end user device(s) 102 may be continually or periodically connected to the licensing authority 100 or separate/disconnected from the licensing authority 100 over a wired or wireless network, such as the Internet. The end user device(s) 102 may be an electronic communication device such as but not limited to a computer, personal digital assistant (PDA), cellular or mobile phone, and other devices that can access, provide, transmit, receive, and modify information over wired or wireless networks. The end user device(s) 102 illustratively includes a processor, decryption processor, database, module, server, computer system or network of computer systems. The network may be a local area network or a wide area network and may be a private or public network of any size or scope. In an illustrative embodiment, the network is the Internet.

Figure 2:
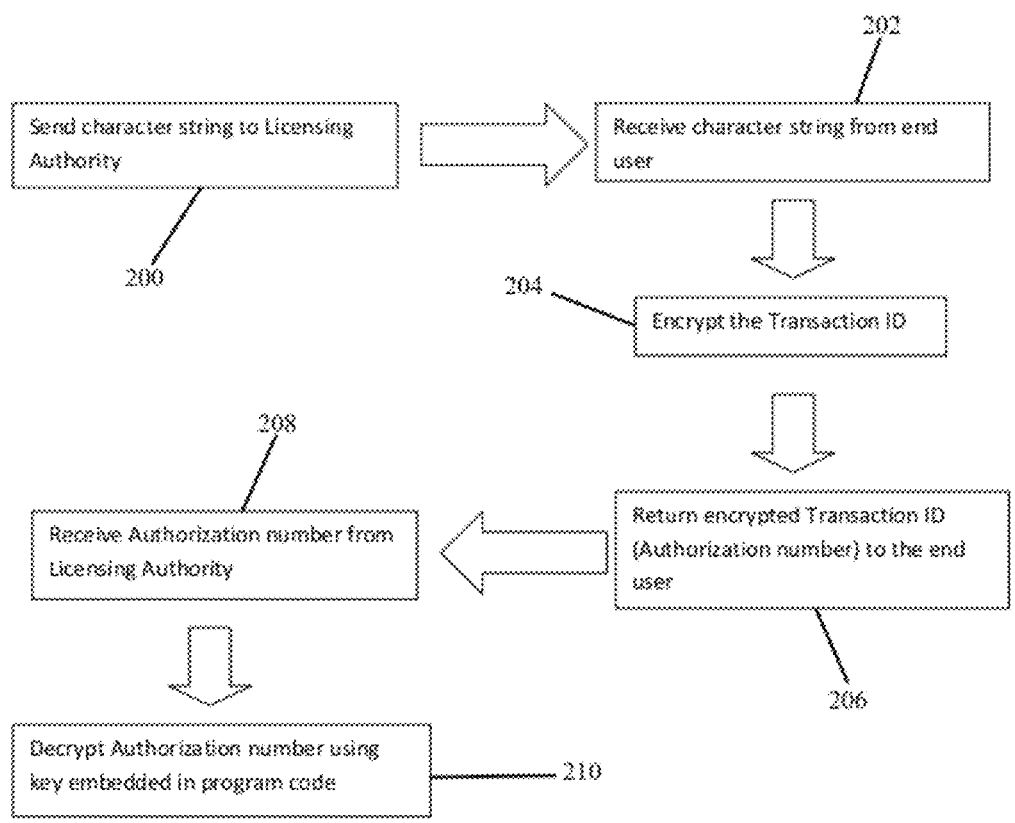
FIG. 2 illustrates an embodiment of a method implemented on the system of authorizing a computer license.

A method of authorizing a computer license according to an illustrative embodiment is described with reference to FIG. 2. According to FIG. 2, the end user device 102 transmits a character string, including a Transaction ID, to the licensing authority 100, illustrated as 200. The licensing authority 100 receives the character string from the end user device 102, illustrated as 202. The licensing authority 100 then encrypts the Transaction ID using an encryption key associated with a product for which the end user is seeking authorization to produce an Authorization number, illustrated as 204. As used herein, a product is defined as each computer file (or set of files) which the publisher or licensing authority expects to sell or lease; for example anything that has its own unique UPC bar code. In the illustrative embodiment, each product is associated with a different encryption key resulting in a different Authorization number being produced for each product based on the same Transaction ID. To obtain the encryption key for the product the licensing authority 100 may retrieve the encryption key by any of various convenient methods such as using the product number as an index into a database which contains all of the encryption keys, hand entering the encryption keys, or encrypting the key and sending it to the license server as part of the activation data, and apply a general purpose encryption algorithm (as known in the art), such as Advanced Encryption Standard (AES) or Blowfish (a keyed, symmetric block cipher, modified to use ASCII digit look up tables, thus limiting the results to numeric characters). The essence of this is that the same identical Transaction ID can be encrypted into as many different Authorization numbers as there are products. The licensing authority 100 then returns the Authorization number to the end user device 102, illustrated as 206.

Examples of encryption of the Transaction ID at the licensing authority 100 are illustrated below in Table 1.

TABLE 1

Illustrates examples of encryption at the licensing authority.

| Product No. | Encryption Key | Transaction ID | Authorization No. |
|---|---|---|---|
| 1 | 12345 | 1101011420 | 7132465899 |
| 2 | 67890 | 1101011420 | 6740923348 |
| 3 | 34567 | 1101011420 | 8764209783 |

As illustrated in Table 1, at the licensing authority 100 a given Transaction ID will always result in a different Authorization Number for each product since each product is associated with a different encryption key.

The end user device 102 receives the Authorization number from the licensing authority 100, illustrated as 208. The end user device 102 then decrypts the Authorization number using a hard coded, and therefore unchangeable, decryption key which results in a decryption algorithm that can only decrypt a series of digits or characters the same way every time, illustrated as 210. Corresponding illustrative decryption may be done by using AES or Blowfish (modified to use ASCII digit look up tables, thus limiting the results to numeric characters). The same Authorization number will always be decrypted into the same Transaction ID. As a result, the product on each end user device 102 is only capable of accepting the Authorization number for that specific product. In another illustrative embodiment, the decryption key could be stamped into an existing product instead of being hard coded.

Examples of decryption of the Authorization number at the end user device 102 are illustrated below in Table 2.

TABLE 2

Illustrates examples of decryption at the end user device.

| Product No. | Decryption Key | Authorization No. | Transaction ID |
| --- | --- | --- | --- |
| 1 | 12345 | 7132465899 | 1101011420 |
| 2 | 12345 | 6740923348 | 8979240010 |
| 3 | 12345 | 8764209783 | 9343208235 |

As illustrated in Table 2, the end user's product only has one decryption key. The decryption key will decrypt a series of digits or characters the same way every time, therefore it can only correctly decrypt products intended for it. Authorization keys for different products will be decrypted into something that does not match the correct Transaction ID. This prevents reverse engineering of the Authorization numbers to produce a rogue authorization number generator for multiple products. Only the Authorization number encrypted using the encryption key associated with the product will produce a correct Transaction ID for the product. In this case Tables 1 and 2 illustrate that product 1 has been authorized, while products 2 and 3 are not authorized.

Since producing different Authorization numbers for each end user device 102 does not involve using an identical hash algorithm at both the licensing authority 100 and the end user device 102, the information transmitted from the end user device 102 to the licensing authority 100 does not have to be a unique Computer ID or include purchaser and/or end user information, as required by the '216 patent described above. This allows the use of a shorter number and one that can be expressed entirely in digits. In order to produce different authorization numbers each time, the Transaction ID must be based on something that constantly changes, such as a date and time. That Transaction ID is then temporarily stored on the hard drive of the end user device 102 in any convenient location and transmitted to the licensing authority 100. When the product is authorized the stored value is retrieved, and the Authorization number is decrypted as described above.

Figure 3:
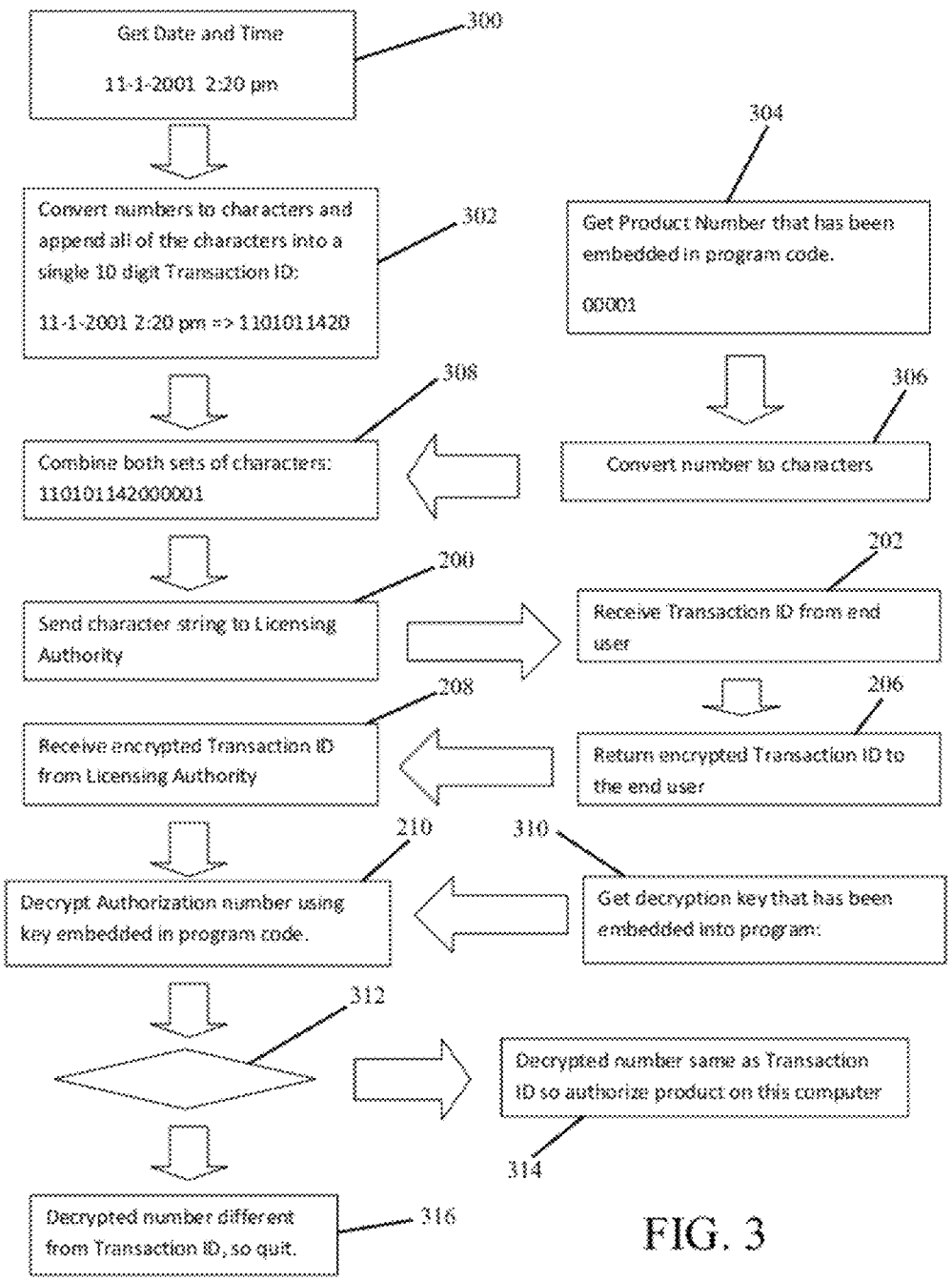
FIG. 3 illustrates an embodiment of a method of authorizing a computer license using a changing Transaction ID.

A method of authorizing a computer license using a changing Transaction ID according to an illustrative embodiment is described with reference to FIG. 3. According to FIG. 3, the end user device 102 obtains the date and time in 24 hour format, illustrated as 300. In an illustrative example, the date and time are Nov. 1, 2001 and 2:20 PM, respectively. The end user device 102 converts the date and time numbers to characters and appends all of the characters into a single Transaction ID (such as a single ten digit Transaction ID: 1101011420), illustrated as 302. One or more checksum digits may be appended to the Transaction ID character string to assure that it was not garbled during transaction. Illustratively, the Transaction ID is stored in a convenient place on the end user device 102.

The end user device 102 also obtains a product number that may be hard coded or embedded in the program code of the product, illustrated as 306. In an illustrative example, the product number is 00001. The end user device 102 converts the product number to characters, illustrated as 306. The end user device 102 then combines both sets of characters, the Transaction ID and the product number, to form a single set of characters, illustrated as 308. In the illustrative example, the Transaction ID (1101011420) and the product number (00001) are combined to form a single fifteen digit set of characters (110101142000001). The end user device 102 transmits the combined Transaction ID and product number to the licensing authority 100, illustrated as 200. One or more digits of checksum can also be added to the combined Transaction ID and product number to insure the information is transmitted correctly.

The licensing authority 100 receives the combined Transaction ID and product number, illustrated as 202, and encrypts the Transaction ID resulting in an Authorization number. The licensing authority 100 then transmits the encrypted Transaction ID or Authorization number to the end user device 102, illustrated as 206. The end user device 102 receives the encrypted Transaction ID or Authorization number from the licensing authority 100, illustrated as 208. The end user device 102 also obtains a decryption key that is hard coded or embedded in the program code of the product, illustrated as 310. The end user device 102 then decrypts the encrypted Transaction ID or Authorization number using the decryption key, illustrated as 210.

The end user device 102 compares the decrypted Transaction ID or decrypted Authorization number with the Transaction ID, illustrated as 312. If the decrypted Authorization number matches the Transaction ID the product is authorized on the end user device 102, illustrated as 314. The authorization check, illustrated as 312, can be run each time the product is executed or a license can be written to the hard drive of the end user device 102 which indicates that the product is authorized to run on the end user device 102. Alternatively, if the decrypted Authorization number does not match the Transaction ID the product is not authorized on the end user device 102 and an error code is returned, illustrated as 316.

Figure 4:
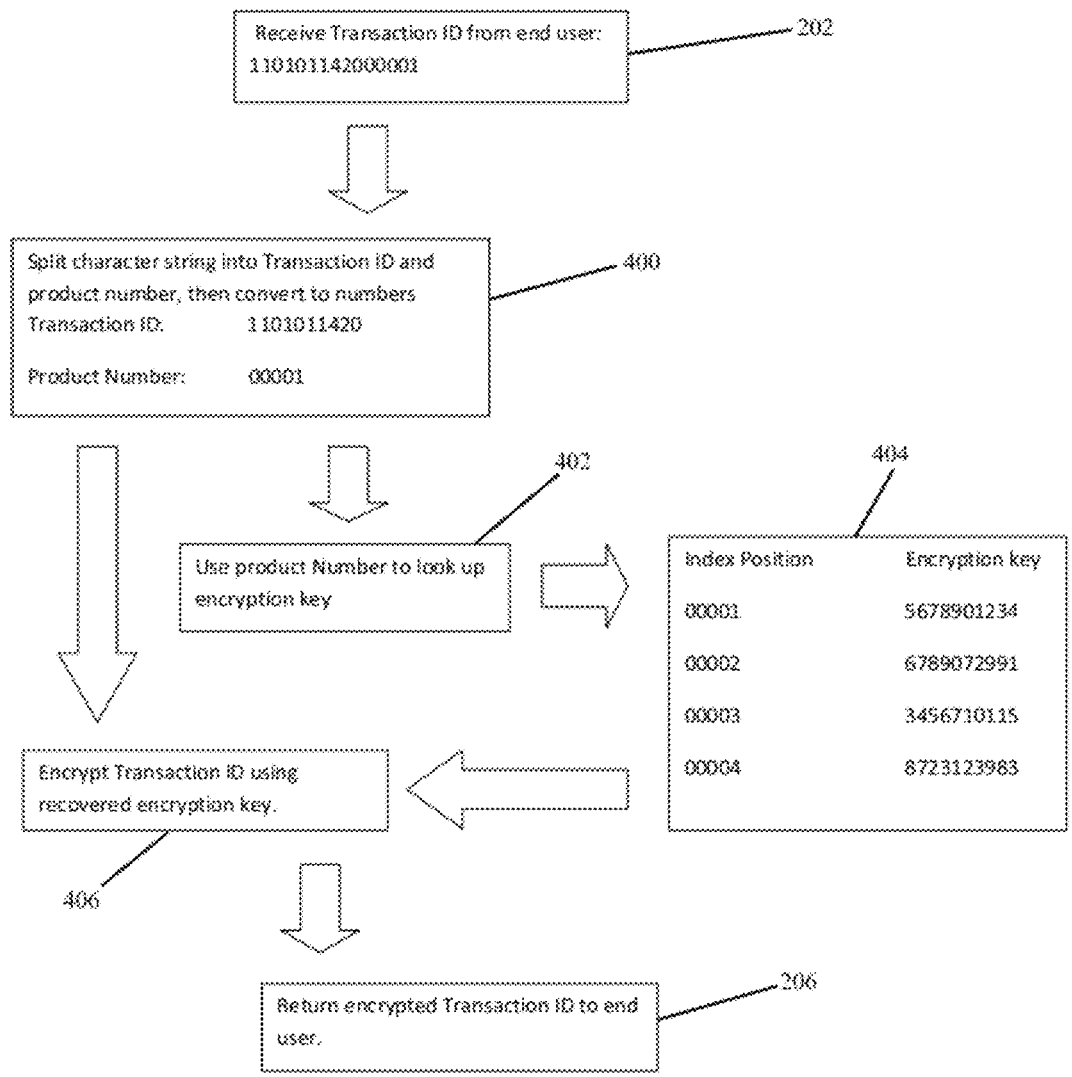
FIG. 4 illustrates an embodiment of a method of encrypting the Transaction ID at the licensing authority.

A method of encrypting the Transaction ID at the licensing authority according to an illustrative embodiment is described with reference to FIG. 4. According to FIG. 4, the licensing authority 100 receives the combined Transaction ID and product number from the end user device 102, illustrated as 202. In the illustrative example above, the combined Transaction ID and product number is the single fifteen digit set of characters (110101142000001). If a checksum was added to the transmitted character string, the combined Transaction ID and product number, the licensing authority 100 calculates the values and compares the calculated values with the checksum. If the calculated values and the checksum do not match then a transmission error code can be returned to the end user device 102. Alternatively, if the calculated values and the checksum match authorization continues.

The licensing authority 100 splits the character string, the combined Transaction ID and product number, into the Transaction ID and the product number, illustrated as 400. In the illustrative example, the Transaction ID is 1101011420 and the product number is 00001. The licensing authority 100 uses the product number as an index to look up an encryption key for the specific product, illustrated as 402. In the illustrative example, the encryption key associated with the product number 00001 is 5678901234, illustrated as 404. In another illustrative embodiment, instead of sending the licensing authority 100 the product number and Transaction ID, the encryption key itself can be encrypted itself and sent to the licensing authority 100, removing the need to use the product number as an index to look up the encryption key. After obtaining the encryption key, the licensing authority 100 encrypts the Transaction ID using the encryption key associated with the product resulting in an Authorization number, illustrated as 406. The licensing authority 100 then transmits the encrypted Transaction ID or Authorization number to the end user device 102, illustrated as 206.

Figure 5:
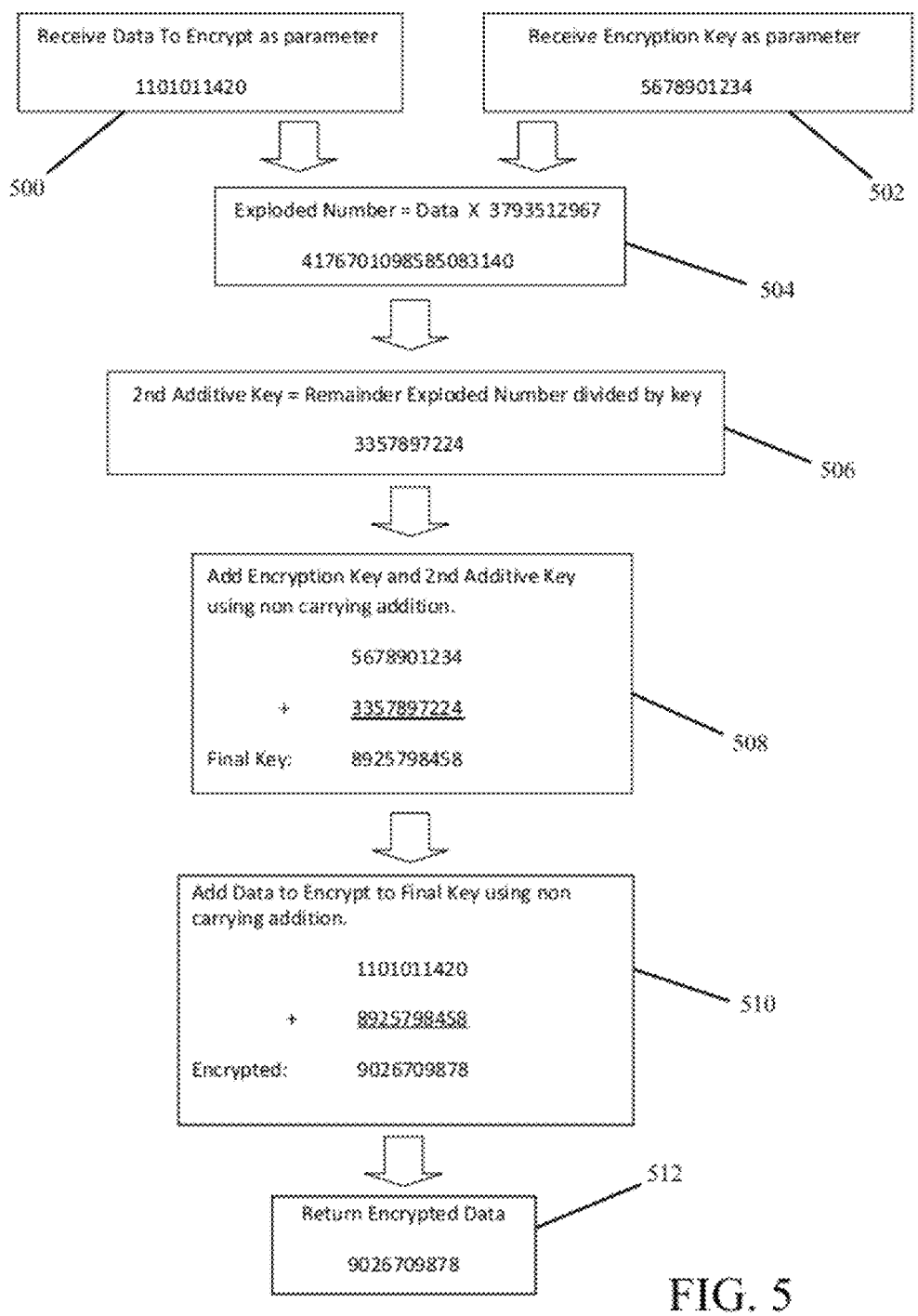
FIG. 5 illustrates and embodiment of a flow diagram of an encryption process.

A flow diagram of an encryption process according to an illustrative embodiment is described with reference to FIG. 5. According to FIG. 5, the licensing authority 100 receives data to encrypt as a parameter, illustrated as 500. In the illustrative example above, the data received is the ten digit Transaction ID (1101011420). The licensing authority 100 also receives an encryption key as a parameter, illustrated as 502. In the illustrative example, the encryption key received is 5678901234. The licensing authority 100 then creates an exploded number, for example 4176701098585083140, by multiplying the data (i.e. the Transaction ID) by a number, for example 3793512967, illustrated as 504. The licensing authority 100 creates a second additive key, for example 3357897224, by taking the remainder of the exploded number divided by the encryption key, illustrated as 506.

The licensing authority 100 then adds the encryption key and the second additive key using non carrying addition to produce a final key, illustrated as 508. In the illustrative example, the encryption key (5678901234) and the second additive key (3357897224) are added using non carrying addition to produce the final key (8925798458). The licensing authority 100 uses the final key and adds the data (i.e. the Transaction ID) using non carrying addition to produce the encrypted data (i.e. the encrypted Transaction ID or Authorization number), illustrated as 510. In the illustrative example, the data (1101011420) is added to the final key (8925798458) using non carrying addition to produce the encrypted data (9026709878). The licensing authority 100 then transmits the encrypted data (i.e. the encrypted Transaction ID or Authorization number) to the end user device 102, illustrated as 512.

In an illustrative embodiment, the systems and methods disclosed herein allow products to be reauthorized on the same end user device 102 with different Authorization numbers each time. This makes reoccurring leasing and/or licensing authorizations possible and authorizations that refill usage counters. The systems and methods disclosed herein make it more difficult to misuse authorization number generators to generate Authorization numbers for different products and for software pirates to modify existing software to produce rogue unlocking key generators. Further, Transaction IDs and authorization numbers are much easier to transmit between the end user device 102 and the licensing authority 100 and they are not prone to mistakes such as misunderstanding letters like B, G, P, T, V, etc. However, alphanumeric IDs, numbers, and keys could be used instead of using entirely digits. Although alphanumeric IDs, numbers, and keys may make verbally transmitting the information more difficult, it would not change the essence of the systems and methods disclosed herein.

In an illustrative embodiment, the system and methods disclosed herein may include a custom dynamic-link library (DLL) on the end user device 102. The product number can be recorded into the custom DLL which is used to protect a particular product. Illustratively, each custom DLL created is only capable of encrypting, decrypting, or verifying an Authorization number generated by the licensing authority 100. Given a particular Authorization number the custom DLL will process it in the same way, for example when verifying that the Authorization number is valid. Further, the custom DLL may create a license table entry based on that DLL's product number.

A two dimensional license table is created on the end user device 102, in a location that is very difficult for the client to access. The first column of the license table contains the various product numbers, a second column contains the date used to create the Transaction ID (or a random number), and a third a column contains the license status. The first entry in the license table is generally a header marking defining the file as a license table. The license table may also include the identifying information for the end user device 102.

In an illustrative embodiment, to identify the end user device 102 the end user device's 102 hard drive electronic serial number (not to be confused with the boot sector serial number) can be obtained. The end user device's 102 hard drive electronic serial number can be stored in the license table, and matched to what is obtained at runtime. If the end user device's 102 hard drive electronic serial number is not available, the end user device's 102 media access control (MAC) address can be used.

In an illustrative embodiment, when authorizing a product the end user device 102 produces a character string to send to the licensing authority 100 when activating the product. For example, a ten digit number based on the date and time may be produced and converted to a character string. In an illustrative embodiment, two digit checksum ASCII digits may be added to the character string producing a twelve digit number. The end user device 102 may then send the resulting characters representing the twelve digit number to the licensing authority 100, along with the product number.

At the licensing authority 100, the licensing authority 100 accepts the characters representing the twelve digit number, validates the ten digits with the two digit checksum ASCII digits, and encrypts the ten digits using an encryption key based on the product number. Four digits of checksum are added to differentiate an error in transmission from an authorization number for another product. This results in a fourteen digit Authorization number. It is important to note that the generation of the Authorization number at the licensing authority 100 is not the same as the DLL on the end user device 102. Specifically, at the licensing authority 100, a given Transaction ID (the ten digit random number) can be processed in many different ways producing different Authorization numbers. While, at the end user device 102, a given Transaction ID or Authorization number is processed by the DLL in the same way every time.

The end user device 102, then receives the fourteen digit Authorization number from the licensing authority 100. The DLL decrypts the first ten digits in the fourteen digit Authorization number character string and compares the first ten digits with the Transaction ID. If the first ten digits in the fourteen digit Authorization number do not match the Transaction ID, an error code is returned to the calling program. If the first ten digits in the fourteen digit Authorization number match the Transaction ID, the last four digits of checksum are compared to the computed amounts for the first ten digits. If the last four digits of checksum match the computed amounts for the first ten digits, the license table entry for that product is set as authorized.

The presence of a license number, which contains the product number as the first several digits, is encrypted, using AES or Blowfish (the keyed, symmetric block cipher modified to use ASCII digit look up tables, thus limiting the results to numeric characters), with an encryption key composed of the serial number portion of the license. Finally, two ASCII digits of checksum are used to verify that the license number is correct. The licensing authority 100 receives the license number, along with the Transaction ID, then decrypts the product number embedded in the license number, then uses that in a lookup table to retrieve the key which is used to encrypt the Transaction ID and produce the ten digit unlocking key, after which time it adds the four digits of checksum.

The end user device 102 pulls the product number from values recorded into variables located inside the DLL then decrypts the first ten digits of the Activation number returned by the activation server. If the decrypted first ten digit character string match the first ten digit characters of the Transaction ID, and the four digits of checksum match the computed values, the table entry for that product number is marked as activated.

While the systems and methods disclosed herein have been described and illustrated in connection with certain embodiments, many variations and modifications will be evident to those skilled in the art and may be made without departing from the spirit and scope of the disclosure. The disclosure is thus not to be limited to the precise details of methodology or construction set forth above as such variations and modification are intended to be included within the scope of the disclosure.

What is claimed is:

1. A system for authorizing use of a product on one or more end user devices, comprising:
   a licensing authority computing device including at least one processor and a memory device including instructions operable to be executed by said at least one processor to perform a set of actions, said at least one processor including:
      a licensing authority processor configured to receive character strings from said one or more end user devices, said character strings having a transaction identifier that is a number that changes each time the user seeks authorization for use of said product;
      an encryption processor in communication with said at least one licensing authority processor and configured to encrypt at least a portion of each of said character strings using a different encryption key for each different product; and
   a decryption processor in communication with said at least one licensing authority processor, said decryption processor configured to decrypt said encrypted portion of said character strings using an unchanging respective decryption key associated with program code of said product, decryption processing being different from encryption processing,
   said licensing authority computing device providing authorization for said one or more end user devices to access said product based on said unchanging respective decryption key that remains unchanged with each activation of said product.

2. The system of claim 1, wherein said transaction identifier received by said licensing authority processor is based on a date and time.

3. The system of claim 1, wherein each of said character strings received by said licensing authority processor includes a product number.

4. The system of claim 1, further comprising at least one database in communication with said licensing authority processor, containing a plurality of said different encryption keys indexed by product number, said licensing authority processor obtaining said different encryption key for each different product from said at least one database.

5. The system of claim 1, further comprising said licensing authority processor obtaining said different encryption key for each different product from said one or more end user devices.

6. The system of claim 5, wherein said different encryption key for each different product obtained by said licensing authority processor is encrypted.

7. The system of claim 3, wherein said at least said portion of each of said character strings encrypted by said encryption processor includes said transaction identifier.

8. The system of claim 7, wherein said different encryption key for each different product used by said encryption processor to encrypt said transaction identifier is associated with said product number.

9. A method of authorizing use of a product on one or more end user devices, comprising:
   receiving by a licensing authority character strings from said one or more end user devices seeking authorization for use of one or more of said different products, said character strings having a transaction identifier having at least a portion that is a random number that changes each time the user activates the product;
   encrypting by said licensing authority at least a portion of each of said character strings using a different encryption key associated with each different product, from an encryption key table;
   transmitting by said licensing authority at least said encryption portion of said character strings to said one or more end user devices for decryption by said one or more end user devices using an unchanging respective decryption key associated with program code of said product; and
   authorizing use of said product on said one or more end user devices based on said unchanging respective decryption key that remains unchanged with each activation of said product.

10. The method of claim 9, wherein said receiving said transaction identifier includes receiving by said licensing authority a unique transaction identifier from said one or more end user devices.

11. The method of claim 10, wherein said receiving said character strings includes receiving by said licensing authority a product number from said one or more end user devices.

12. The method of claim 9, further comprising obtaining by said licensing authority said different encryption key associated with each different product from a database.

13. The method of claim 9, further comprising obtaining by said licensing authority said different encryption key associated with each different product from at least one of said one or more end user devices.

14. The method of claim 10, wherein said encrypting said at least said portion of said character strings includes encrypting by said licensing authority said unique transaction identifier.

15. A method of authorizing use of a product on an end user device, comprising:
   receiving by a licensing authority a unique transaction identifier and an associated product number from said end user device, said unique transaction identifier having at least a portion that is a random number that changes each time the user activates the product;
   obtaining by said licensing authority a specific encryption key associated with said product number from an encryption key table using said product number as an index, said table including different respective encryption keys associated with different products;
   encrypting by said licensing authority said unique transaction identifier using said specific encryption key;
   transmitting by said licensing authority an encrypted transaction identifier to said end user device for decryption by said end user device using an unchanging decryption key associated with program code of said product, said unchanging decryption key remains unchanged with each activation of said product; and authorizing use of said product on said end user device based on said decryption of said encrypted transaction identifier using said unchanging decryption key.

16. The method of claim 15, wherein said receiving said unique transaction identifier includes receiving by said licensing authority said unique transaction identifier based on a date and time from said end user device.

17. The method of claim 15, wherein said receiving said unique transaction identifier includes receiving by said licensing authority said unique transaction identifier including at least one checksum appended to said unique transaction identifier from said end user device.

18. A method of authorizing use of a product on an end user device, comprising:
receiving by a licensing authority a transaction identifier from said end user device seeking authorization for use of said product, said transaction identifier having at least a portion that is a random number that changes each time said user activates said product;
encrypting by said licensing authority said transaction identifier using a specific encryption key associated with said product, said specific encryption key being one of a plurality of different respective encryption keys from an encryption key table having respective encryption keys associated with different products;
transmitting by said licensing authority said encrypted transaction identifier to said end user device for decryption by said end user device using an unchanging decryption key associated with program code of said product, said unchanging decryption key remains unchanged with each activation of said product; and
authorizing use of said product on said end user device based on decryption of said encrypted transaction identifier using said unchanging decryption key.

19. A system for authorizing use of a product on one or more end user devices, comprising:
a licensing authority computing device including a processor and a memory including instructions operable to be executed by the processor to perform a set of actions, the licensing authority processor configured to receive character strings from the one or more end user devices, the character strings being different each time the user seeks authorization for use of the product, the licensing authority processor further configured to encrypt at least a portion of each of the character strings using a different encryption key for each different product, from an encryption key table, to form an authorization number; and
a decryption processor in communication with the licensing authority processor, the decryption processor configured to decrypt the authorization number using an unchanging respective decryption key associated with program code of the product,
the licensing authority computing device providing authorization for the one or more end user devices to access the product based on the unchanging respective decryption key that remains unchanged with each activation of the product.

* * * * *